United States Patent
Takayama

(10) Patent No.: US 9,400,396 B2
(45) Date of Patent: Jul. 26, 2016

(54) DIFFRACTIVE OPTICAL ELEMENT AND IMAGE PICKUP OPTICAL SYSTEM

(75) Inventor: Hidemi Takayama, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 67 days.

(21) Appl. No.: 13/283,810

(22) Filed: Oct. 28, 2011

(65) Prior Publication Data
US 2012/0120494 A1   May 17, 2012

(30) Foreign Application Priority Data

Nov. 11, 2010  (JP) .................................. 2010-252830

(51) Int. Cl.
*G02B 27/42* (2006.01)
*G02B 5/18* (2006.01)
*G02B 13/04* (2006.01)

(52) U.S. Cl.
CPC .......... *G02B 27/4272* (2013.01); *G02B 5/1823* (2013.01); *G02B 13/04* (2013.01); *G02B 27/4211* (2013.01)

(58) Field of Classification Search
CPC .......................................... G02B 5/18–5/1895
USPC .......................................... 359/558, 566–576
See application file for complete search history.

(56) References Cited

U.S. PATENT DOCUMENTS

| | | | | |
|---|---|---|---|---|
| 4,795,236 A * | 1/1989 | Ise | .................. | G02B 5/1871 348/291 |
| 5,883,744 A * | 3/1999 | Maruyama | ............... | G02B 3/04 359/565 |
| 6,825,979 B2 * | 11/2004 | Ogawa | .......................... | 359/570 |
| 2004/0062180 A1 * | 4/2004 | Mimori et al. | ............ | 369/112.08 |
| 2009/0052040 A1 * | 2/2009 | Suzuki | ................. | G02B 5/1842 359/576 |
| 2009/0141354 A1 * | 6/2009 | Kobayashi | ......... | B29D 11/0073 359/571 |

(Continued)

FOREIGN PATENT DOCUMENTS

| | | |
|---|---|---|
| JP | 09-049976 A | 2/1997 |
| JP | 11-048355 A | 2/1999 |

(Continued)

OTHER PUBLICATIONS

Carmina Londono, et al.; "The design of achromatized hybrid diffractive lens systems"; SPIE vol. 1354 International Lens Design Conference, 1990; Poloroid Corporation, Cambridge, MA; pp. 30-37.

*Primary Examiner* — Bumsuk Won
*Assistant Examiner* — Jeffrey Madonna
(74) *Attorney, Agent, or Firm* — Rossi, Kimms & McDowell LLP

(57) ABSTRACT

A diffractive optical element that is used for an optical system includes a first diffraction grating and a second diffraction grating. The first and second diffraction gratings are disposed in contact with each other, one of the first and second diffraction gratings has a refractive index distribution and has a diffractive surface that includes a grating surface having a predetermined inclination and a grating wall surface having a predetermined height, and the diffractive surface has a shape in which an inclination of the grating surface of a diffraction grating having the greater refractive index distribution is decreased and a height of the grating wall surface is lowered with respect to a shape in which a phase difference based on a phase difference function that corrects an aberration of the optical system is added to a shape of a base surface that forms one of the first and second diffraction gratings.

13 Claims, 5 Drawing Sheets

(56) References Cited

U.S. PATENT DOCUMENTS

| | | | |
|---|---|---|---|
| 2010/0039707 A1* | 2/2010 | Akahane | B82Y 30/00 359/576 |
| 2010/0110548 A1* | 5/2010 | Korenaga | G02B 5/1852 359/571 |
| 2010/0134889 A1* | 6/2010 | Takayama | G02B 5/1866 359/576 |
| 2010/0142053 A1* | 6/2010 | Nakabayashi | 359/570 |
| 2010/0238400 A1* | 9/2010 | Volk | G02C 7/061 351/159.42 |
| 2011/0038050 A1* | 2/2011 | Murata | G02B 1/041 359/576 |
| 2011/0102898 A1* | 5/2011 | Korenaga et al. | 359/570 |
| 2011/0122755 A1* | 5/2011 | Tateyama et al. | 359/571 |
| 2011/0235178 A1* | 9/2011 | Minami | G02B 5/1876 359/566 |
| 2011/0304916 A1* | 12/2011 | Ushigome | G02B 5/1814 359/576 |
| 2012/0182618 A1* | 7/2012 | Okada | G02B 5/1871 359/570 |

FOREIGN PATENT DOCUMENTS

| | | | | |
|---|---|---|---|---|
| JP | 2008-180963 A | | 8/2008 | |
| JP | WO 2010/013616 | * | 2/2010 | G11B 7/135 |
| WO | WO2010/073573 | * | 7/2010 | |

* cited by examiner

DIFFRACTIVE OPTICAL ELEMENT AND IMAGE PICKUP OPTICAL SYSTEM

BACKGROUND OF THE INVENTION

1. Field of the Invention

The present invention relates to a diffractive optical element having improved diffraction efficiency in a wide wavelength range and an image pickup optical system using the diffractive optical element.

2. Description of the Related Art

Previously, as a method of reducing a chromatic aberration of an optical system, a method of providing a diffractive optical element that has a diffraction function as apart of the optical system has been known (SPIE Vol. 1354, International Lens Design Conference (1990)). The diffractive optical element is manufactured by making a shape of a diffraction grating on a mold by cutting or the like and then transferring the shape into a resin by a molding process such as an UV curing, a thermal curing, or an injection molding. When the diffractive optical element is manufactured by this molding process, a refractive index distribution is generated inside a diffraction grating. Particularly, when the molding is performed by the UV curing using a material in which inorganic nanoparticles are dispersed into a base resin material of the diffraction grating, the nanoparticles move during the curing process and therefore the concentration of the nanoparticles is different in accordance with an area of the diffraction grating. Since the nanoparticles have a refractive index that is different from a refractive index of the base resin material, eventually the refractive index distribution is generated.

Japanese Patent Laid-Open No. H11-48355 discloses a diffractive optical element that has a corrected shape. The shape is manufactured by previously deforming a mold in an opposite direction with respect to a shift from a design shape that is generated when a protection film is formed to obtain a design shape after molding the diffractive optical element. Japanese Patent Laid-Open No. 2008-180963 discloses a diffractive optical element that is formed by previously correcting a shape of a mold in an opposite direction in accordance with a change of a film thickness of an anti-reflection film in order to suppress the deterioration of diffraction efficiency caused by non-uniformity of the film thickness of the anti-reflection film. Japanese Patent No. 3252708 discloses a scanning optical system that corrects an image plane movement caused by an internal strain that is generated during molding an optical element. In the scanning optical system disclosed in Japanese Patent No. 3252708, the refractive index distribution that is generated when the optical element is formed by using an injection mold is corrected by previously shifting a focal length.

However, in any of Japanese Patent Laid-Open No. H11-48355, Japanese Patent Laid-Open No. 2008-180963, and Japanese Patent No. 3252708, when the refractive index distribution exists in the diffraction grating, an optical path length of transmitted light that transmits through the diffraction grating is shifted from a design value and therefore the diffraction efficiency is deteriorated.

SUMMARY OF THE INVENTION

The present invention provides a diffractive optical element and an image pickup optical system that maintain high diffraction efficiency even when a refractive index distribution is generated inside a grating of the diffractive optical element.

A diffractive optical element as one aspect of the present invention is a diffractive optical element that is used for an optical system. The diffractive optical element includes a first diffraction grating configured by a first material having a first refractive index and a first dispersion and a second diffraction grating configured by a second material having a second refractive index lower than the first refractive index and a second dispersion higher than the first dispersion. The first diffraction grating and the second diffraction grating are disposed in adhesive contact with each other, one of the first diffraction grating and the second diffraction grating has a refractive index distribution and has a diffractive surface that includes a grating surface arrayed at a predetermined pitch and having a predetermined inclination and a grating wall surface having a predetermined height, and the diffractive surface has a shape in which an inclination of the grating surface of a diffraction grating having a greater refractive index distribution of the first diffraction grating and the second diffraction grating is decreased and a height of the grating wall surface is lowered with respect to a shape in which a phase difference based on a phase difference function that corrects an aberration of the optical system is added to a shape of a base surface that forms one of the first diffraction grating and the second diffraction grating.

An image pickup optical system that includes the diffractive optical element also constitutes another aspect of the present invention.

Further features and aspects of the present invention will become apparent from the following description of exemplary embodiments with reference to the attached drawings.

DESCRIPTION OF THE PREFERRED EMBODIMENTS

Figure 1:
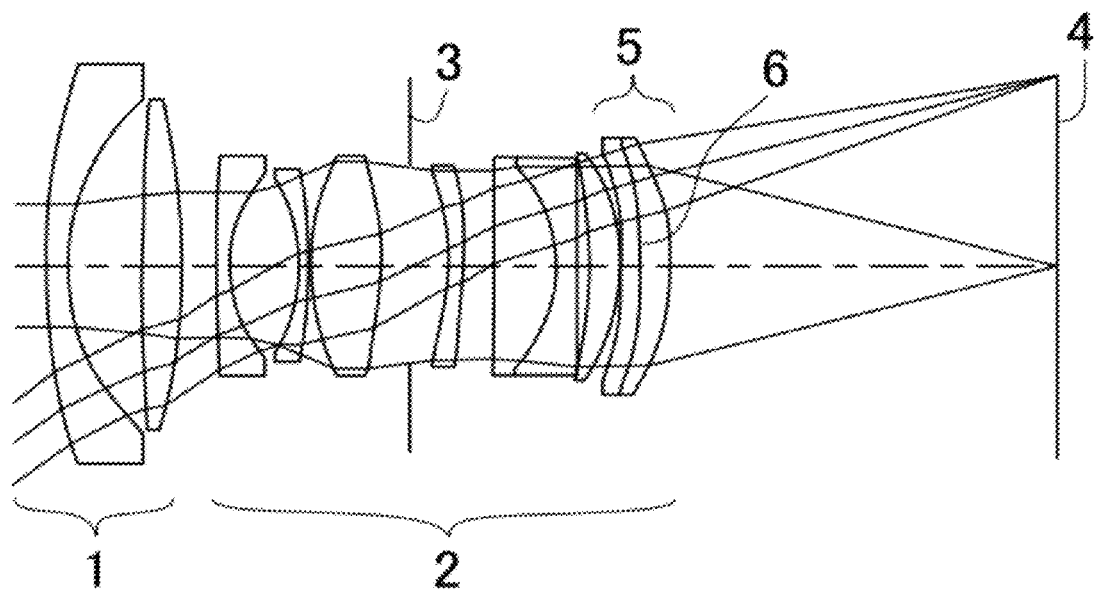
FIG. 1 is a configuration diagram of an optical system in Embodiment 1.

Exemplary embodiments of the present invention will be described below with reference to the accompanied drawings. In each of the drawings, the same elements will be denoted by the same reference numerals and the duplicate descriptions thereof will be omitted.

[Embodiment 1]

First of all, an optical system in which a diffractive optical element in Embodiment 1 of the present invention is used will be described. FIG. 1 is a configuration diagram of the optical system in the present embodiment, which is a cross-sectional diagram of a wide-angle image pickup optical system of a retrofocus type. In FIG. 1, the image pickup optical system is an optical system of a single focal length that includes a first lens unit 1 having a negative refractive power and a second lens unit 2 having a positive refractive power, in order from an object side to an image side. The second lens unit 2 is provided with an aperture stop 3. On a bonded surface of a cemented lens 5 that is disposed at the image side relative to the aperture stop 3 and that is closest to an image plane 4, a diffractive optical element 6 having a positive power is provided. A chromatic aberration that is generated in this optical system is appropriately corrected by the diffractive optical element 6.

Figure 2:
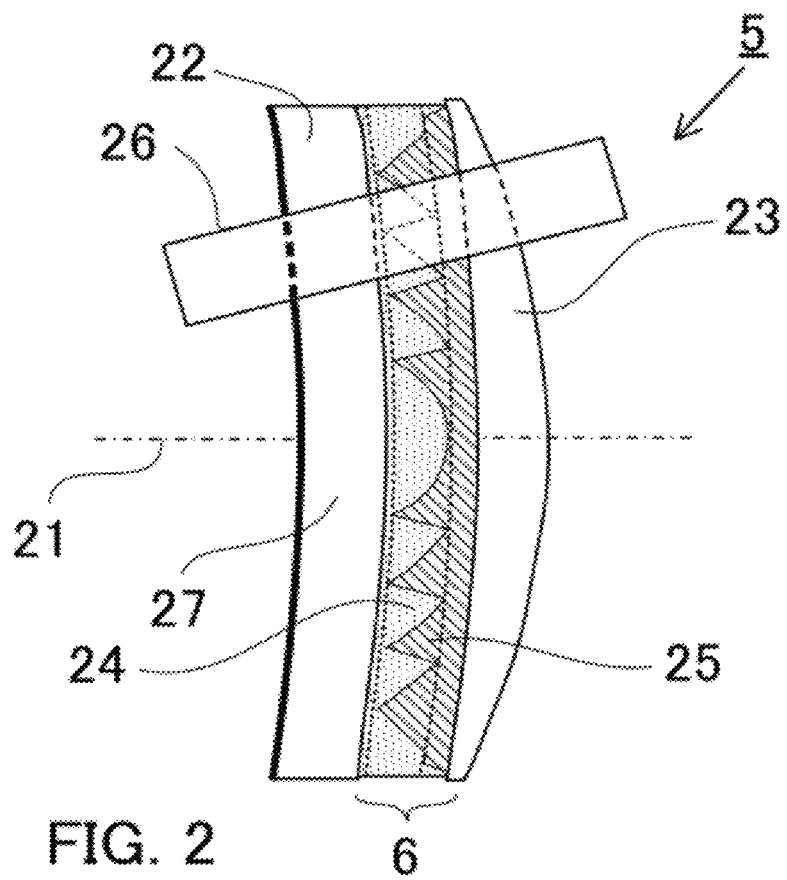
FIG. 2 is a cross-sectional diagram of a cemented lens (a diffractive optical element) in Embodiment 1.

FIG. 2 is a cross-sectional diagram of the cemented lens 5 (the diffractive optical element 6), which is an enlarged diagram of the cemented lens 5 that is illustrated in FIG. 1. In FIG. 2, reference numeral 21 denotes an optical axis, reference numeral 22 denotes a first lens that includes the diffractive optical element 6 at a second surface side, and reference numeral 23 denotes a second lens that includes the diffractive optical element 6 at a first surface side. Reference numeral 24 denotes a first diffraction grating of the diffractive optical element 6. The first diffraction grating 24 is configured by a first material having a first refractive index nd1 and a first dispersion (Abbe number: vd1). Reference numeral 25 denotes a second diffraction grating of the diffractive optical element 6. The second diffraction grating 25 is configured by a second material having a second refractive index nd2 that is lower than the first refractive index nd1 and a second dispersion (Abbe number: vd2) that is higher than the first dispersion.

In the present embodiment, the diffractive optical element 6 has a positive power, and a high-refractive index and low-dispersion material is used as a material (a first material) of the first diffraction grating 24 and a low-refractive index and high-dispersion material is used as a material (a second material) of the second diffraction grating 25. In other words, in the diffractive optical element 6 of the present embodiment, conditions of nd1>nd2 and vd1>vd2 are met. Reference numeral 26 denotes an off-axis light beam that enters a grating surface of the diffractive optical element 6, and the light beam 26 is diffracted by the plurality of diffraction gratings (the first diffraction grating 24 and the second diffraction grating 25) as illustrated in FIG. 2.

Figure 5:
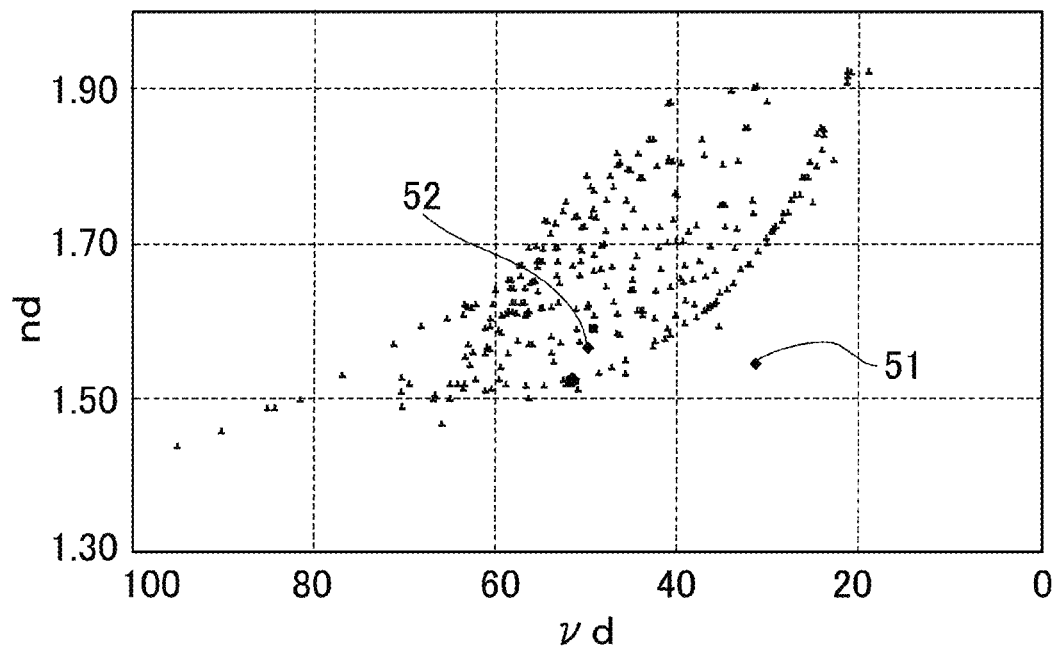
FIG. 5 is a diagram of illustrating a refractive index and Abbe number of a material that constitutes the diffractive optical element in Embodiment 1.

FIG. 5 is a diagram of illustrating the Abbe numbers and the refractive indexes of the first diffraction grating 24 and the second diffraction grating 25 in the present embodiment. In the present embodiment, as the high-refractive and low-dispersion material that constitutes the first diffraction grating 24, a material of an acrylic ultraviolet curable resin (nd=1.52, vd=51) that is mixed with $ZrO_2$ nanoparticles of 9.5 vol % is used. The high-refractive index and low-dispersion material that is obtained by dispersing the nanoparticles has the refractive index nd=1.565 and the Abbe number vd=50.0, which is indicated as reference numeral 52 in FIG. 5. As the low-refractive index and high-dispersion material, a resin of the same ultraviolet curable resin (a base resin material) that is mixed with ITO (inorganic nanoparticles) having a nanoparticle dispersion concentration of 6 vol % is used. The low-refractive index and high-dispersion material that is obtained by dispersing the nanoparticles has the refractive index nd=1.544 and the Abbe number vd=31.4, which is indicated as reference numeral 51 in FIG. 5. The ITO nanoparticles are dispersed into (mixed with) the base resin material to be able to provide a material that has a linear abnormal dispersibility and low Abbe number. As a result, in the present embodiment, the highest diffraction efficiency can be obtained when the grating height is 28.2 μm.

Figure 3:
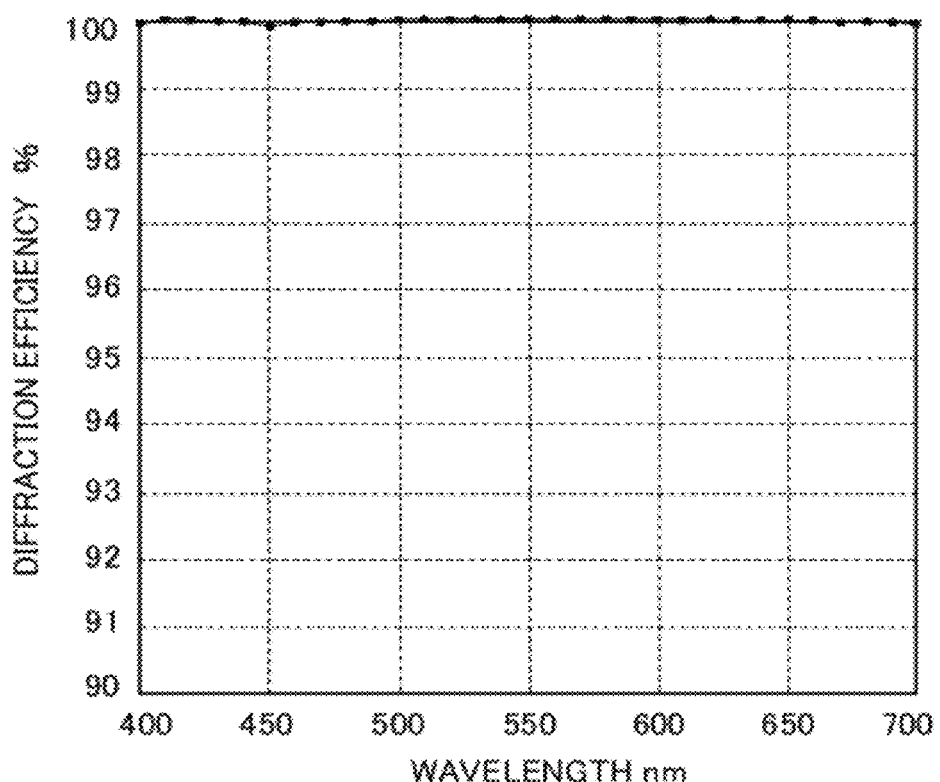
FIG. 3 is a graph of diffraction efficiency of first-order light of the diffractive optical element in Embodiment 1.
Figure 4:
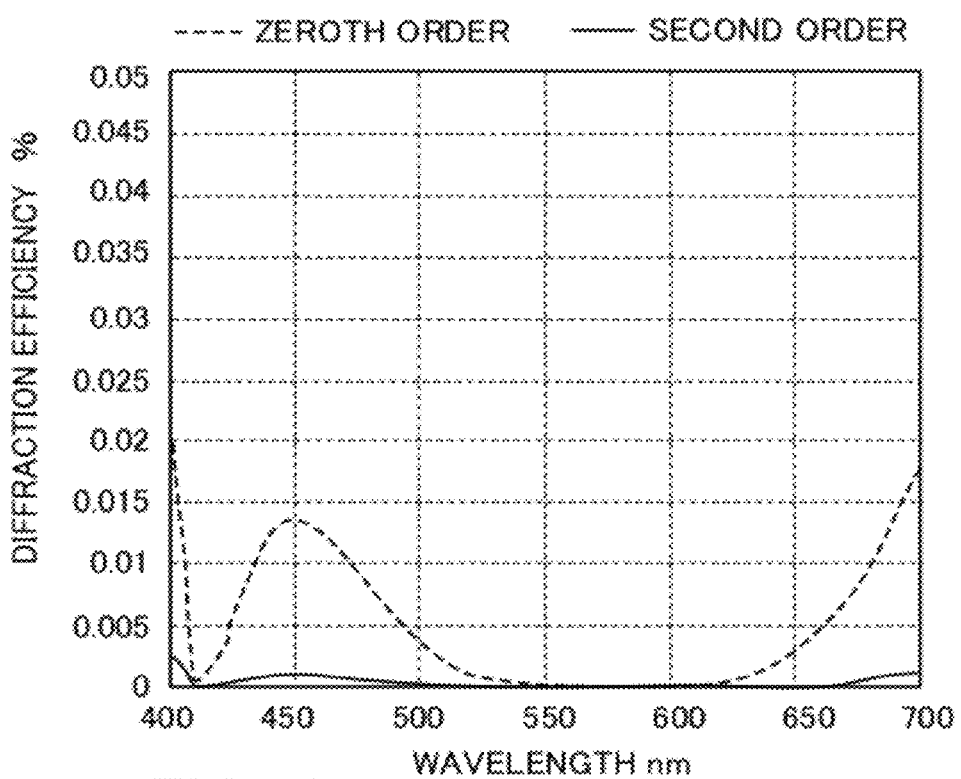
FIG. 4 is a graph of diffraction efficiency of zeroth-order light and second-order light of the diffractive optical element in Embodiment 1.

FIG. 3 is a diagram of illustrating a diffraction efficiency of first-order light that is obtained in conditions described above. FIG. 4 is a diagram of illustrating diffraction efficiencies of zeroth-order light and second-order light. The first-order diffracted light is diffracted light that is used for the imaging by the image pickup optical system, which maintains a good diffraction efficiency of nearly 100% in a whole wavelength range as illustrated in FIG. 3. As illustrated in FIG. 4, the diffraction efficiencies of both the zeroth-order light and the second-order light that cause unnecessary diffracted light generated concentrically around a high brightness light source are suppressed to be extremely small value of lower than or equal to 0.02%.

The refractive index of ITO is changed due to the generation of free carriers that is caused by doping of tin or holes of oxygen in addition to the change of the refractive index that is caused by electron transition, which is different from other inorganic oxides. The refractive index dispersion caused by the electron transition abruptly changes at a short wavelength side of 400 nm to 450 nm in a visible range and has characteristics (nonlinear characteristics) that second-order dispersion (θgF) of the refractive index is higher than a so-called normal line where common glasses are distributed. On the other hand, the refractive index dispersion that is caused by the free carriers has extremely strong linear characteristics, which has abrupt changes at a long wavelength side of 600 nm to 700 nm in the visible range. Due to the combination of the two influences, the second-order dispersion (θgF) of the refractive index is extremely low compared to other inorganic oxides. Accordingly, similarly to ITO, $SnO_2$ and ATO (antimony-doped $SnO_2$) that is transparent and is free carriers or the like can also be used.

Figure 6:
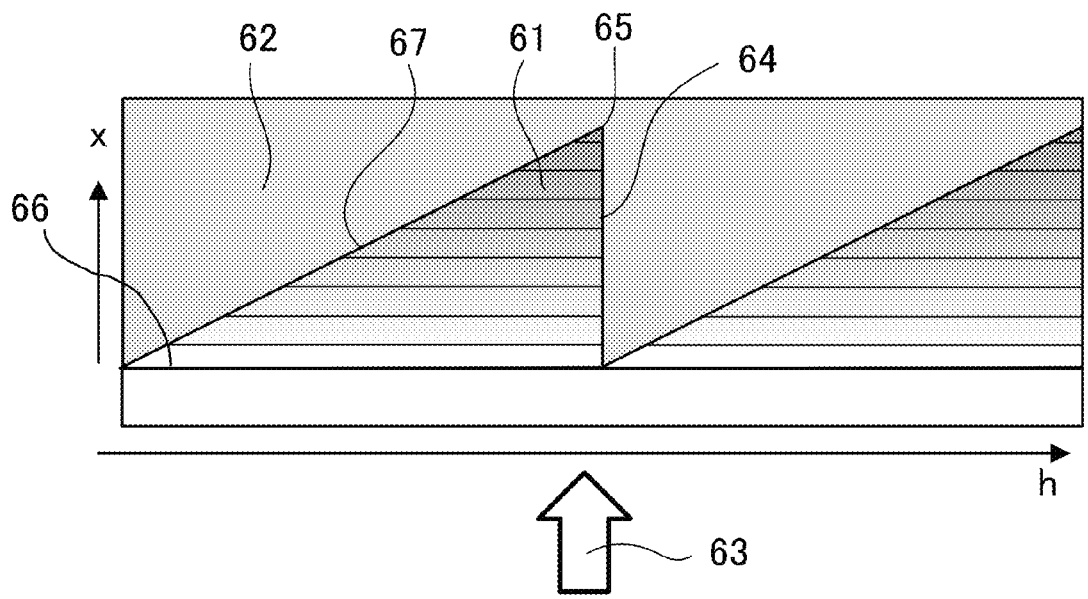
FIG. 6 is a diagram of illustrating a refractive index distribution of the diffractive optical element in Embodiment 1.

FIG. 6 is a diagram of illustrating a refractive index distribution of the diffractive optical element in the present embodiment. The diffractive optical element of FIG. 6 is configured by adhesively contact a diffraction grating 61 made of the low-diffractive index and high-dispersion material 51 and a diffraction grating 62 made of the high-refractive index and low-dispersion material 52. The diffraction grating 61 has a refractive index distribution and also has a diffractive surface that includes a grating surface 67 that is arranged at a predetermined pitch (200 μm in the present embodiment) and that has a predetermined inclination and a grating wall surface 64 having a predetermined height.

In FIG. 6, the same line described inside the diffraction grating 61 indicates a position where the refractive index is the same. The diffraction grating of the present embodiment is assumed to be formed by UV curing, and the resin is cured by illuminating UV light 63 from a lower side of FIG. 6 after a mold (not shown) is arranged at an upper side of FIG. 6 to fill uncured resin into the mold. As a material in this case is the low-refractive index and high-dispersion material described above (the second material), and the nanoparticles move to a top of the grating since the ultraviolet curing commences from the lower side. The nanoparticles of ITO have a refractive index that is higher than a refractive index of the resin (the base resin material). Therefore, the refractive index distribution that has a low refractive index at the lower side of FIG. 6 and that has a high refractive index at the upper side of FIG. 6. This refractive index distribution linearly changes in a height direction of the grating wall surface 64 (in an x-axis direction), and the refractive index n(x) can be represented as n(x)=ax+n0 (a: coefficient, n0: constant) where the x-axis indicates a direction from a base surface 66 to a grating top 65 as illustrated in FIG. 6.

Figure 7:
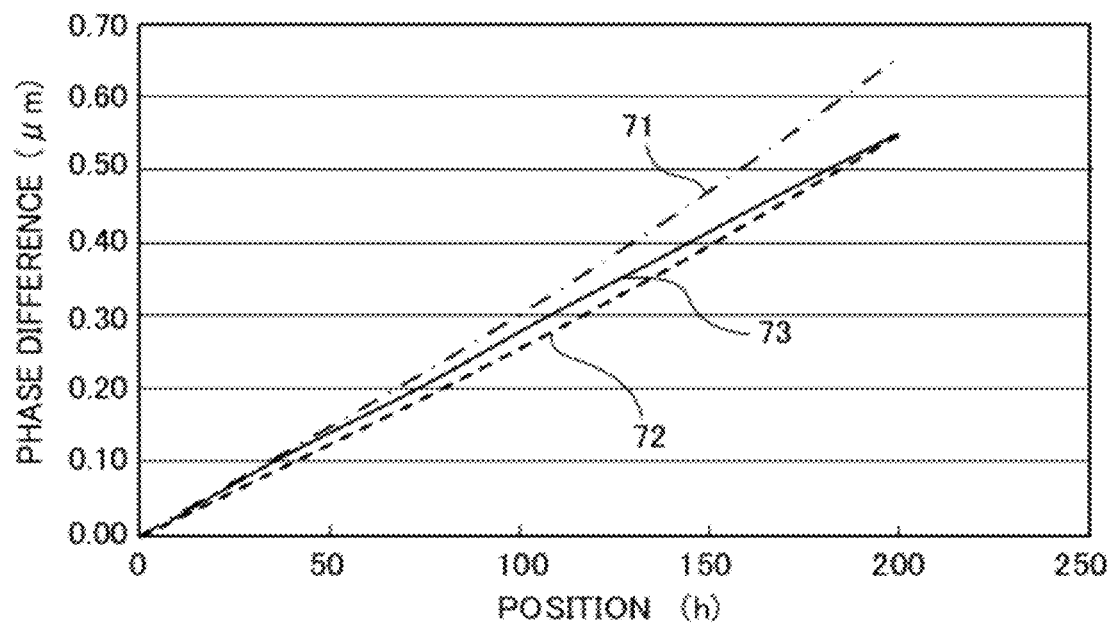
FIG. 7 is a diagram of illustrating a relationship between a phase difference (an optical path length) and a position of transmitted light that transmits through the diffractive optical element in Embodiment 1.

FIG. 7 is a diagram of illustrating a relationship between a phase difference (an optical path difference) and a position of a transmitted wavefront when light transmits through the diffraction grating of FIG. 6 on condition that the pitch of the grating surface is 200 μm. A lateral axis indicates a position in a direction orthogonal to an optical axis (a direction indicated as h of FIG. 6), which indicates only one period. In the expression of the refractive index distribution described above (n (x)=ax+n0), the calculation is performed using the coefficient a=4e−4.

As indicated by a solid line 73 in FIG. 7, the light transmitting through the diffraction grating needs to ideally obtain a phase difference of 1λ per one period in order to improve the diffraction efficiency. On the other hand, when the refractive index distribution exists in the diffraction grating, as indicated by a dashed-dotted line 71 in FIG. 7, the phase difference changes in a direction where the phase difference is greater than a designed ideal line (the solid line 73) as the grating height is higher. In this state, since the diffraction efficiency is lowered, a case in which a target value of the grating height is equally shifted is indicated as a dotted line 72 in FIG. 7. As illustrated in FIG. 7, a phase at a position of the grating top is coincident with an ideal value, but an actual phase difference has a U-shaped warpage and therefore it is necessary to perform a correction including this warpage.

Figure 8:
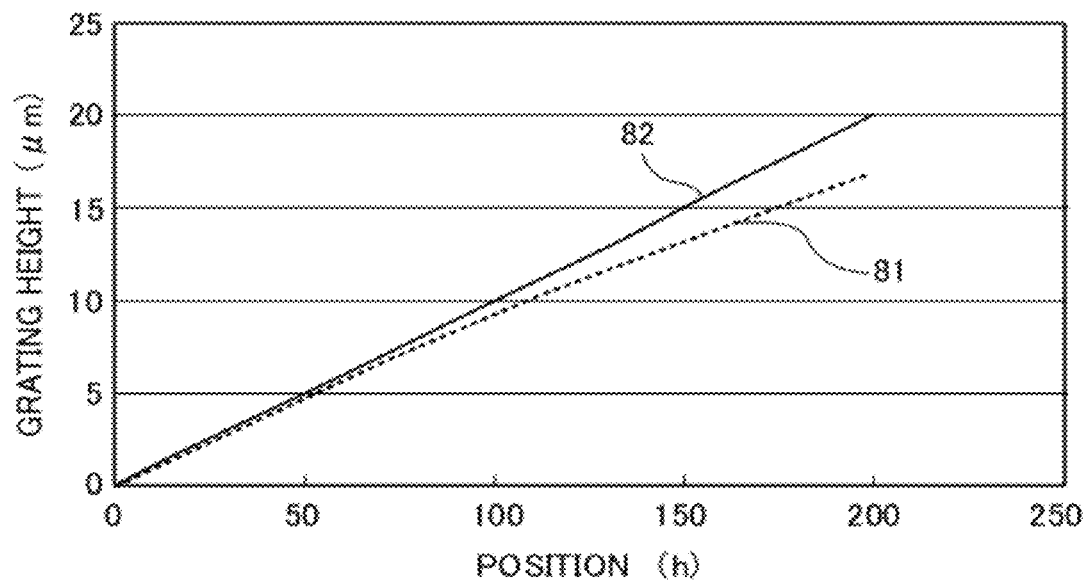
FIG. 8 is a diagram of illustrating a relationship between a grating height and a position of the diffractive optical element in Embodiment 1.

FIG. 8 is a diagram of illustrating a relationship between the grating height and the position of the diffractive optical element. In FIG. 8, reference numeral 81 denotes a shape of a grating surface of the diffraction grating (a grating shape) when the best diffraction efficiency is applied. As illustrated in FIG. 8, in order to set the phase difference to an ideal value, an adding amount of the phase to the grating wall surface is gradually changed in accordance with the position (h) of the grating surface in a pitch direction so as to lower the grating surface of the diffraction grating (so as to be changed in a direction where the inclination of the grating surface is decreased), i.e. so as to be have a convex shape at an upper side.

In the present embodiment, when a distance in a direction orthogonal to the optical axis with reference to the optical axis is h, a coefficient of n-th order (n is an even number) is Cn/2, and a wavelength is λ, a phase difference function φ(h) is defined as following Expression (1).

$$\varphi(h) = (C1h^2 + C2h^4 + C3h^6 + \dots) \times \frac{2\pi}{\lambda} \quad (1)$$

In Expression (1), the phase difference function φ(h) is a function of correcting an aberration of an optical system. When a position of a base surface of the diffraction grating is X(h), an annular zone number that is counted from an optical axis center in defining an annular zone around the optical axis center as one annular zone is k, a height of the grating wall surface (the grating height) is d0, and a correction function is G(h), a position x of the diffractive surface in the optical axis direction is represented by following Expression (2).

$$x = X(h) + \left(k - \frac{\varphi(h)}{2\pi}\right) \times d0 \times G(h) \quad (2)$$

In Expression (2), the correction function G(h) is a function of the height h (the distance) from the optical axis, which is obtained by dividing a design optical path length that is determined from the phase difference function φ(h) as a design value by an ideal optical path length that is calculated by integrating a product of an actual refractive index and a height of an ideal grating height.

Thus, the shape of the diffractive surface in the present embodiment is determined by a value that is obtained by multiplying the phase difference (the optical path length) that is added based on the phase difference function φ(h) by the correction function G(h) that changes in accordance with the position of the grating surface in the pitch direction (array direction). As a result, the diffractive surface has a shape in which the inclination of the grating surface of the diffraction grating having a greater refractive index distribution is decreased and the height of the grating wall surface is lowered with respect to the shape in which the phase difference function is added to the shape of the base surface (for example, the base surface 66 in FIG. 6). More specifically, in one period of the grating surface, the inclination is gradually decreased with increasing distance from the optical axis. Accordingly, the shape of the diffraction grating is designed so as to meet for example Expression (2) to be able to provide a diffractive optical element and an image pickup optical system that have high diffraction efficiency.

[Embodiment 2]

Figure 9:
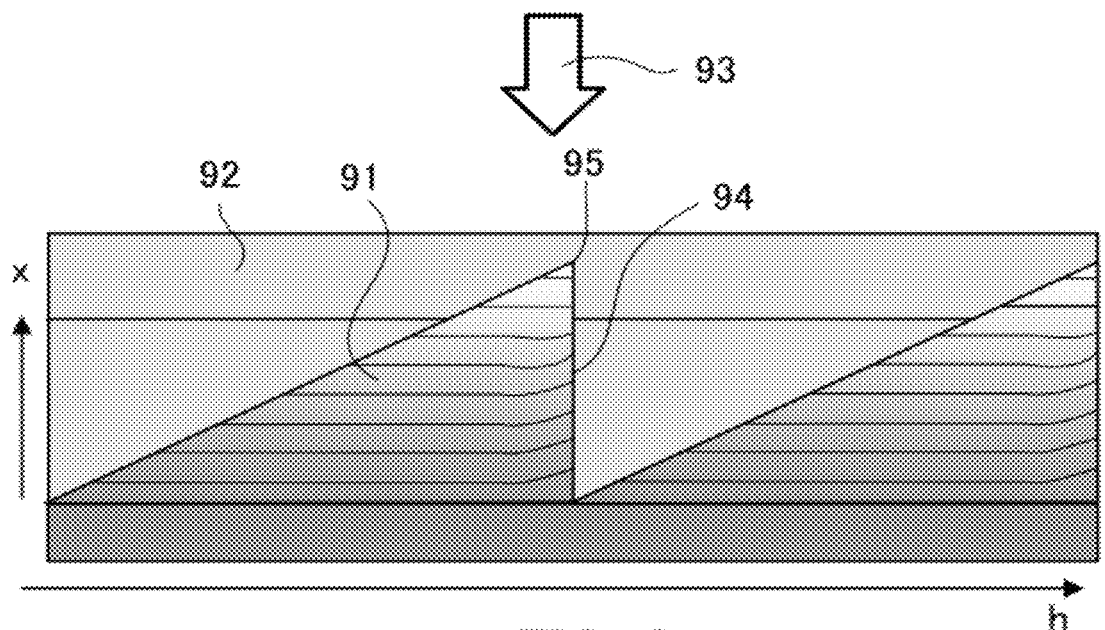
FIG. 9 is a diagram of illustrating a refractive index distribution of a diffractive optical element in Embodiment 2.

Next, Embodiment 2 of the present invention will be described. FIG. 9 is a diagram of illustrating a refractive index distribution of a diffractive optical element in the present embodiment. The diffractive optical element of the present embodiment is configured by adhesively contacting diffraction gratings 91 and 92. In FIG. 9, each of lines illustrated inside the diffraction gratings 91 and 92 indicates a position of an equal refractive index.

The diffraction grating of the present embodiment is formed by a UV curing. The diffraction grating 92 made of a high-refractive index and low-dispersion material is molded and then the uncured low-refractive index and high-dispersion material is filled and UV light 93 is irradiated from an upper side in FIG. 9 to harden the low-refractive index and high-dispersion material to form the diffraction grating 91. The same material as the material in Embodiment 1 (FIG. 6) is used as the low-refractive index and high dispersion material. Since the ultraviolet curing commences from the upper side in FIG. 9, the ITO nanoparticles move to a valley portion of the grating. Since the ITO nanoparticles has a refractive index higher than a refractive index of a resin (a base resin material), a refractive index distribution having a lower refractive index at the upper side and a higher refractive index at the lower side is obtained as illustrated in FIG. 9. In the vicinity of a grating wall surface 94, the refractive index of the diffraction grating 91 tends to be increased. This is because the velocity of the resin curing is low near the grating wall surface 94 and the nanoparticles are likely to be concentrated near the grating wall surface 94.

As illustrated in FIG. 9, the refractive index distribution of the diffraction grating 92 made of the high-refractive index and low-dispersion material is smaller than the refractive index distribution of the diffraction grating 91 made of the low-refractive index and high-dispersion material. This result is a result of an actual study, and an amount of generating the refractive index distribution depends on complicated factors such as viscosity that affects the mobility of the nanoparticles, a surface state of the nanoparticles, a UV transmittance of the resin material, a curing speed, or the like, and therefore it is realistic that the amount is confirmed after actually forming the diffraction grating. Accordingly, in practice, it is preferred that a wavefront of light that transmits inside the diffraction grating be directly measured to assume its internal state to obtain an optimum shape.

Since the optical path length is obtained by integral of the refractive index and the length in a direction where the light passes, the correction is performed so that the grating top 95 of the diffraction grating 91 (the low-refractive index and high-dispersion material) in which a large amount of refractive index distribution is generated is lowered, i.e. so that the height of the grating wall surface 94 is lowered, in the present embodiment similarly to Embodiment 1. This correction enables the phase to be closer to an ideal value. As described above, in the vicinity of the grating wall surface 94, the refractive index of the diffraction grating 91 is shifted so as to be heightened compared to its inside. Therefore, it is preferred that a component that corrects the shift amount be added to the correction function G (h) to enlarge the amount of decreasing the grating top 95.

Figure 10:
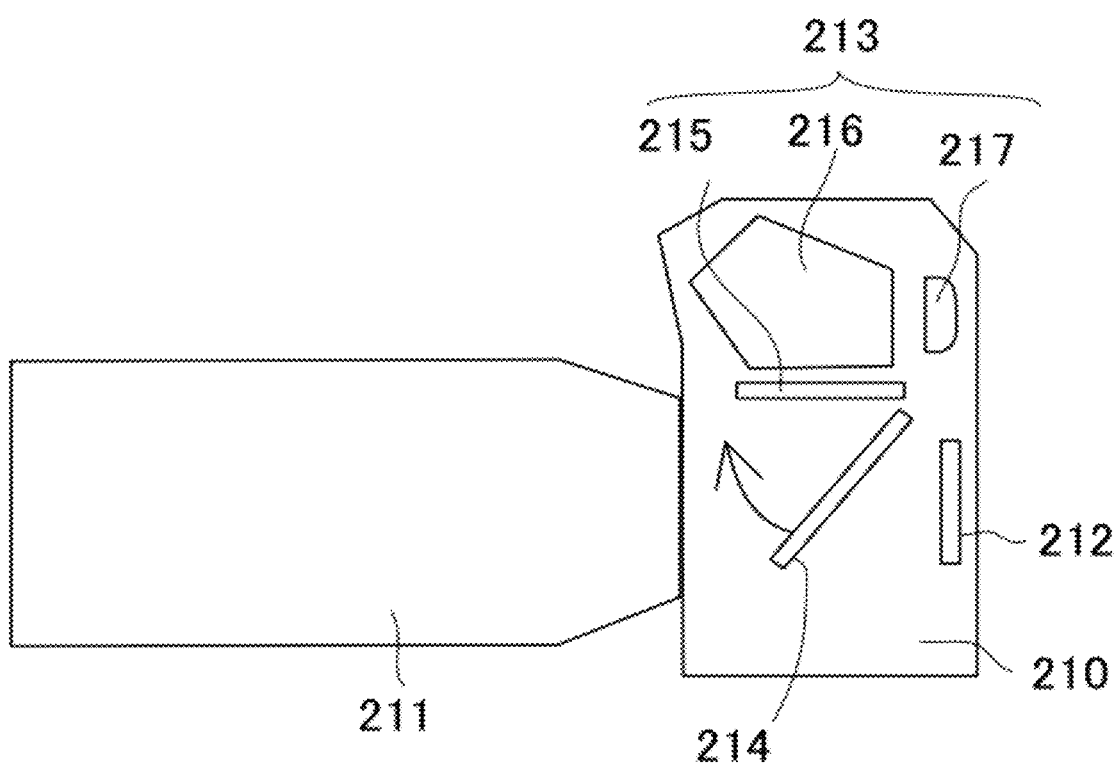
FIG. 10 is a schematic configuration diagram of an image pickup apparatus in the present embodiment.

Next, an image pickup apparatus in which the image pickup optical system (the diffractive optical element) of each embodiment described above is used will be described. FIG. 10 is a schematic configuration diagram of the image pickup apparatus in the present embodiment. In FIG. 10, reference numeral 210 denotes a single-reflex camera body, and reference numeral 211 denotes an interchangeable lens that is used in the image pickup apparatus. Reference numeral 212 denotes a photosensitive material such as a film or an image pickup element that records an object image that is obtained via the interchangeable lens 211. Reference numeral 213 denotes a finder optical system that observes the object image that is obtained from the interchangeable lens 211. Reference numeral 214 denotes a quick return mirror that rotates to switch light from the interchangeable lens 211 between in a direction of the photosensitive material 212 and a direction of the finder optical system 213 to be transmitted.

When the object image is observed by a finder, the object image that is imaged on a focusing plate 215 via the quick return mirror 214 is changed to be an erected image by the pentaprism 216 to enlarge and observe the image using an eyepiece optical system 217. When taking an image, the quick return mirror 214 rotates in an arrow direction in FIG. 10 and the object image is imaged on the photosensitive material 212 to be recorded. The image pickup optical system of the present embodiment further includes a sub-mirror and a focus detection apparatus (not shown).

In the present embodiment, the image pickup optical system (the diffractive optical element) of each embodiment described above is included to be able to provide an image pickup apparatus that has a high optical performance. The present embodiment can also be similarly applied to a single-lens reflex camera that does not include a quick return mirror.

According to each embodiment described above, a diffractive optical element that maintains high diffraction efficiency even when a refractive index distribution is generated inside a diffraction grating that constitutes the diffractive optical element can be provided. The diffractive optical element of each embodiment described above is applied to an image pickup optical system to suppress unnecessary diffracted light that generates when a high brightness light source is illuminated onto the refractive optical element to be able to provide an image pickup optical system that has an aberration correction effect of the diffractive optical element and that has a small size and a good chromatic aberration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Each embodiment described above adhesively contacts two different diffraction gratings, but the embodiment is not limited to this and can also be applied to a case in which these diffraction gratings are closely disposed. Furthermore, each embodiment described above can be applied to a first material when a first material having a high refractive index and a low dispersion is configured by dispersing an inorganic nanoparticles into abase resin material and a refractive index distribution of the first material is greater than a refractive index distribution of a second material.

This application claims the benefit of Japanese Patent Application No. 2010-252830, filed on Nov. 11, 2010, which is hereby incorporated by reference herein in its entirety.

What is claimed is:

1. A diffractive optical element comprising:
a diffraction grating including a base surface, a plurality of grating surfaces, and a plurality of grating wall surfaces, the plurality of grating surfaces and the plurality of grating wall surfaces being arranged on the base surface,
wherein the diffraction grating is made from a resin material containing inorganic nanoparticles that are dispersed unevenly to provide a refractive index distribution,
wherein an inclination of each of the grating surfaces gradually gets smaller as a distance from the center of the base surface increases,
wherein the refractive index distribution causes a rate of increase of a phase difference of light transmitting through the diffraction grating to increase as the distance from the center of the base surface increases, and
wherein a height of each of the grating wall surfaces is determined based on the refractive index distribution to reduce the rate of increase of the phase difference.

2. The diffractive optical element according to claim 1, wherein the inorganic nanoparticles are indium doped tin oxide nanoparticles.

3. The diffractive optical element according to claim 1, wherein the refractive index changes toward a top of the diffraction grating.

4. The diffractive optical element according to claim 1, further comprising another diffraction grating that is adjacent to the diffraction grating and is made from a material different from that of the diffraction grating.

5. The diffractive optical element according to claim 4, wherein the refractive index distribution of the diffraction grating is greater than that of the another diffraction grating.

6. The diffractive optical element according to claim 4, wherein:
the refractive index of the diffraction grating is lower than that of the another diffraction grating, and
a dispersion of the diffraction grating is higher than that of the another diffraction grating.

7. A diffractive optical element comprising:
a first diffraction grating and a second diffraction grating that are disposed adjacent to each other,
wherein the first diffraction grating includes a base surface, a plurality of grating surfaces, and a plurality of grating wall surfaces, the plurality of grating surfaces and the plurality of grating wall surfaces being arranged on the base surface, wherein the first diffraction grating has a refractive index distribution, wherein an inclination of each of the grating surfaces gradually gets smaller as a distance from the center of the base surface increases, wherein the refractive index distribution causes a rate of increase of a phase difference of light transmitting through the first diffraction grating to increase as the distance from the center of the base surface increases, and wherein a height of each of the grating wall surfaces is determined based on the refractive index distribution to reduce the rate of increase of the phase difference.

8. The diffractive optical element according to claim 7, wherein the inorganic nanoparticles are indium doped tin oxide nanoparticles.

9. The diffractive optical element according to claim 7, wherein the refractive index changes toward a top of the diffraction grating.

10. The diffractive optical element according to claim 7, wherein the refractive index distribution of the first diffraction grating is greater than that of the second diffraction grating.

11. The diffractive optical element according to claim 7, wherein:

the refractive index of the first diffraction grating is lower than that of the second diffraction grating, and a dispersion of the first diffraction grating is higher than that of the second diffraction grating.

12. A method for manufacturing a diffractive optical element comprising the steps of:

forming a plurality of grating surfaces and a plurality of grating wall surfaces on a base surface by:
filling into a mold a resin material in which inorganic nanoparticles are dispersed; and
irradiating an ultraviolet (UV) light to the resin material, wherein a diffraction grating, including the base surface, the plurality of grating surfaces, and the plurality of grating wall surfaces, a refractive index distribution, is generated due to unevenness of the inorganic nanoparticles dispersed in the resin material, wherein the grating surfaces are formed so that an inclination of each of the grating surfaces gradually gets smaller as a distance from the center of the base surface increases, wherein the refractive index distribution causes a rate of increase of a phase difference of light transmitting through the diffraction grating to increase as the distance from the center of the base surface increases, and wherein a height of each of the grating wall surfaces is determined based on the refractive index distribution to reduce the rate of increase of the phase difference.

13. The method according to claim 12, wherein:

the UV light is irradiated to the resin material along a direction perpendicular to the base surface, and the refractive index distribution changes along the direction perpendicular to the base surface.

* * * * *